United States Patent
Harter et al.

(10) Patent No.: US 8,442,508 B2
(45) Date of Patent: May 14, 2013

(54) ELECTRONIC DRIVER LOGGING SYSTEM AND METHOD

(75) Inventors: Thomas C. Harter, Neenah, WI (US); Michael K. Kuphal, Greenville, WI (US); Paul A. Naundorf, Neenah, WI (US); Randel J. Thome, Oshkosh, WI (US)

(73) Assignee: J.J. Keller & Associates, Inc., Neenah, WI (US)

( * ) Notice: Subject to any disclaimer, the term of this patent is extended or adjusted under 35 U.S.C. 154(b) by 1422 days.

(21) Appl. No.: 12/027,021

(22) Filed: Feb. 6, 2008

(65) Prior Publication Data

US 2008/0188217 A1    Aug. 7, 2008

Related U.S. Application Data

(60) Provisional application No. 60/888,458, filed on Feb. 6, 2007.

(51) Int. Cl.
    *H04M 3/00*    (2006.01)
(52) U.S. Cl.
    USPC .......................................... 455/419; 455/418
(58) Field of Classification Search .... 455/414.1–414.3, 455/418–420, 422.1
    See application file for complete search history.

(56) References Cited

U.S. PATENT DOCUMENTS

| | | | |
|---|---|---|---|
| 5,541,840 A | 7/1996 | Gurne et al. | |
| 5,623,403 A | 4/1997 | Highbloom | |
| 5,633,622 A | 5/1997 | Patterson | |
| 5,680,328 A | 10/1997 | Skorupski et al. | |
| 5,893,893 A | 4/1999 | Holt et al. | |
| 5,974,349 A | 10/1999 | Levine | |
| 6,181,992 B1 | 1/2001 | Gurne et al. | |
| 6,253,129 B1 | 6/2001 | Jenkins et al. | |
| 6,259,354 B1 | 7/2001 | Underwood | |
| 6,317,668 B1 | 11/2001 | Thibault | |
| 6,351,695 B1 | 2/2002 | Weiss | |
| 6,408,232 B1 | 6/2002 | Cannon et al. | |
| 6,421,590 B2 | 7/2002 | Thibault | |
| 6,430,496 B1 | 8/2002 | Smith et al. | |
| 6,526,341 B1* | 2/2003 | Bird et al. | 701/35 |
| 6,542,077 B2 | 4/2003 | Joao | |
| 6,587,046 B2 | 7/2003 | Joao | |
| 6,622,083 B1* | 9/2003 | Knockeart et al. | 701/202 |
| 6,681,987 B1 | 1/2004 | Ford | |
| 6,690,260 B1 | 2/2004 | Ashihara | |
| 6,694,248 B2 | 2/2004 | Smith et al. | |
| 6,718,239 B2 | 4/2004 | Rayner | |

(Continued)

OTHER PUBLICATIONS

News Archives, Turnpike Global Technologies, 2007, Retrieved from Internet using waybackmachine.org, Dec. 25, 2007 <URL: http://web.archive.org/web/20071225141544/http://www.turnpikeglobal.com/news_archives/>.

(Continued)

*Primary Examiner* — Melody Mehrpour
*Assistant Examiner* — Emem Stephen
(74) *Attorney, Agent, or Firm* — Michael Best & Friedrich LLP

(57) ABSTRACT

A system for logging performance of a driver operating a vehicle that has a vehicle information system from which least one vehicle operating parameter may be obtained. The vehicle operating parameter collected through the vehicle information system and operator information collected from a portable device are wirelessly communicated to a remote host through a network such as the Internet.

32 Claims, 10 Drawing Sheets

U.S. PATENT DOCUMENTS

| | | |
|---|---|---|
| 6,795,759 B2 | 9/2004 | Doyle |
| 6,807,481 B1 | 10/2004 | Gastelum |
| 6,812,888 B2 | 11/2004 | Drury et al. |
| 6,842,762 B2 | 1/2005 | Raithel et al. |
| 6,847,873 B1 | 1/2005 | Li |
| 6,856,879 B2 | 2/2005 | Arakawa et al. |
| 7,072,746 B1 | 7/2006 | Burch |
| 2001/0010028 A1 | 7/2001 | Thibault |
| 2002/0133275 A1 | 9/2002 | Thibault |
| 2002/0183920 A1 | 12/2002 | Smith et al. |
| 2002/0195503 A1 | 12/2002 | Allen, Jr. et al. |
| 2003/0071899 A1 | 4/2003 | Joao |
| 2003/0130774 A1 | 7/2003 | Tripathi et al. |
| 2005/0171692 A1 | 8/2005 | Hamblen et al. |

OTHER PUBLICATIONS

"EOBR connects to handhelds," Feet Owner, Jun. 1, 2006, Retrieved from Internet using waybackmachine.org, Feb. 14, 2008 <URL: http://web.archive.org/web/20080214083431/http://fleetowner.com/mag/fleet_eobr_connects_handhelds/index.html>.

\* cited by examiner

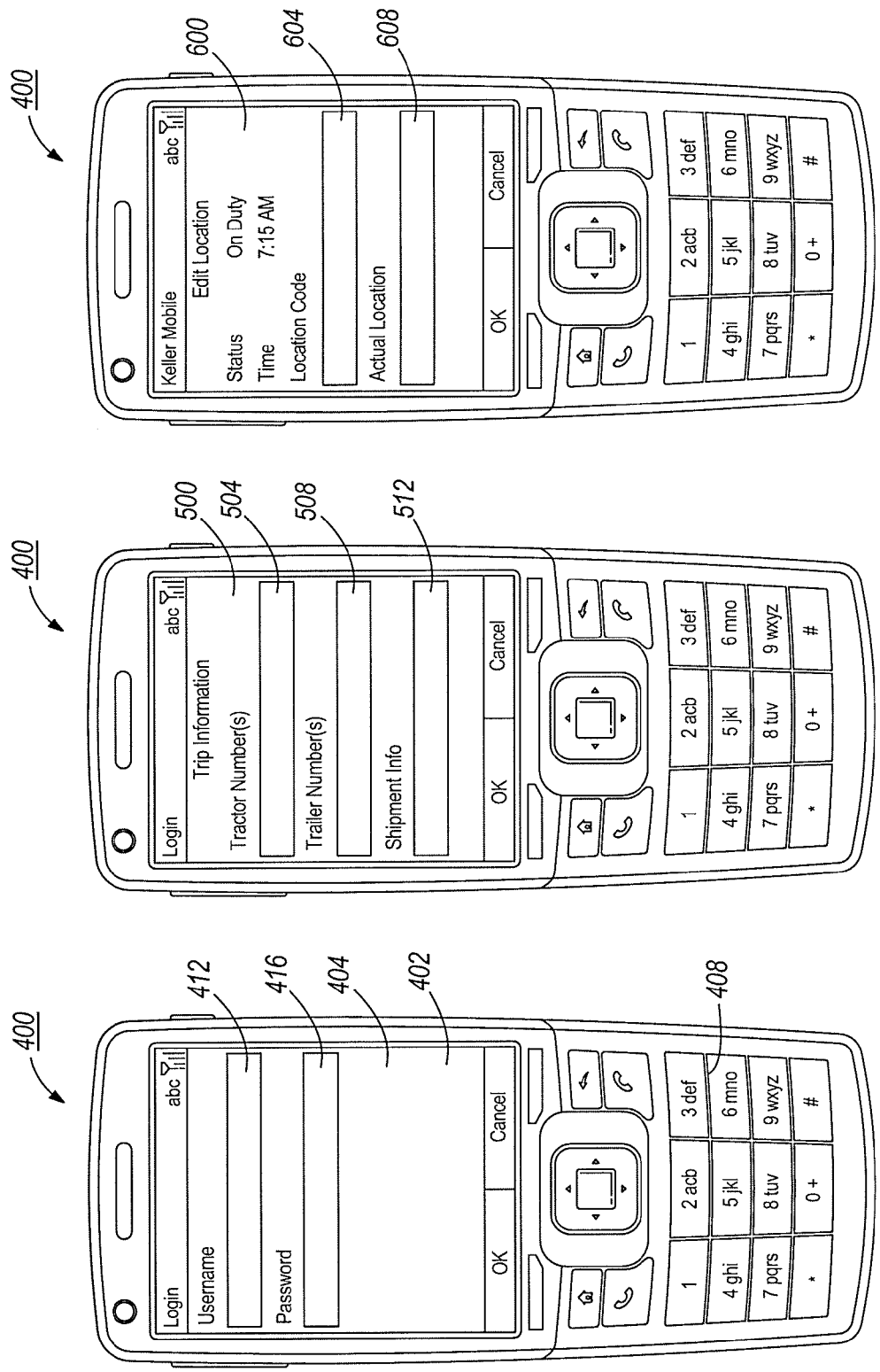

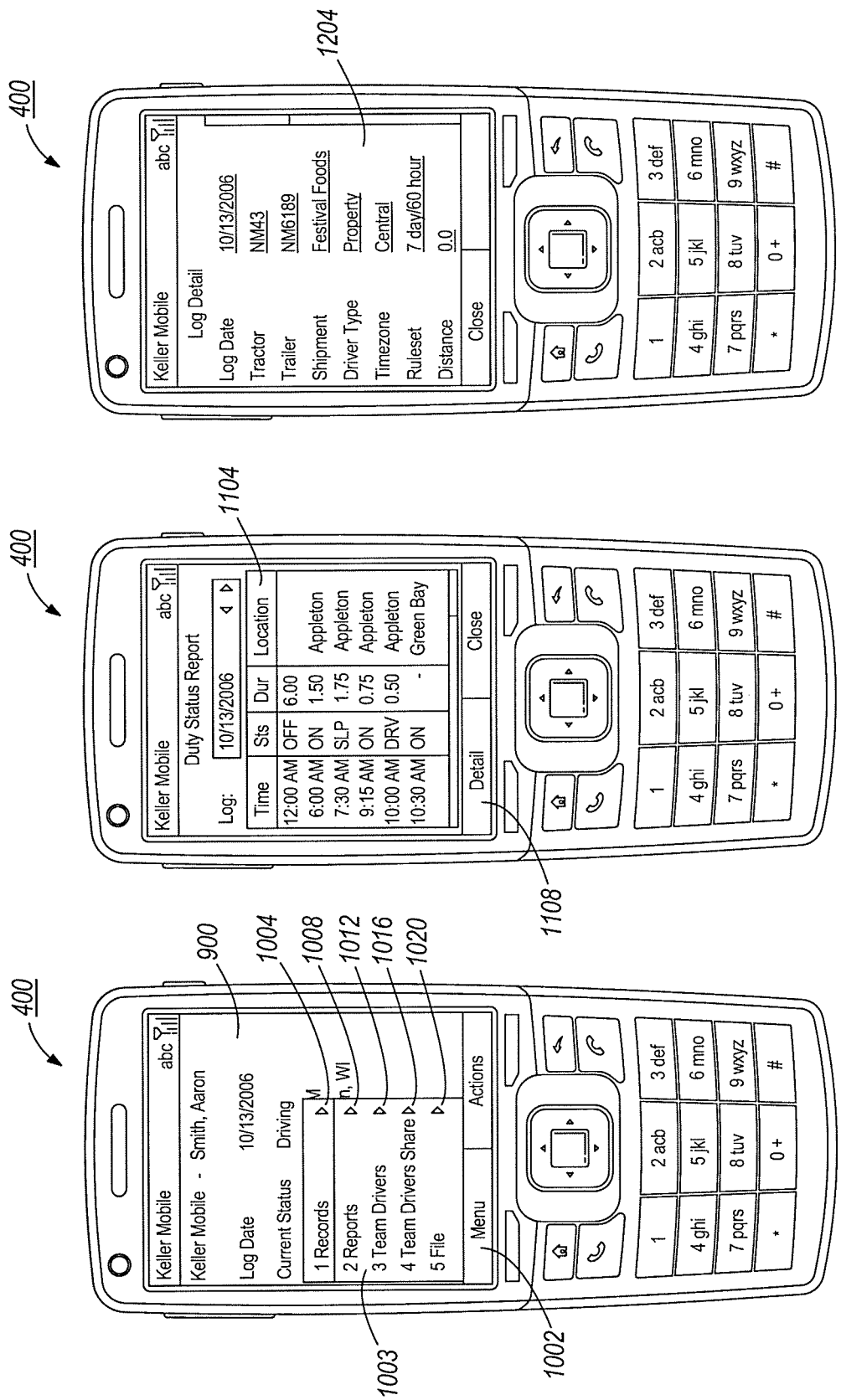

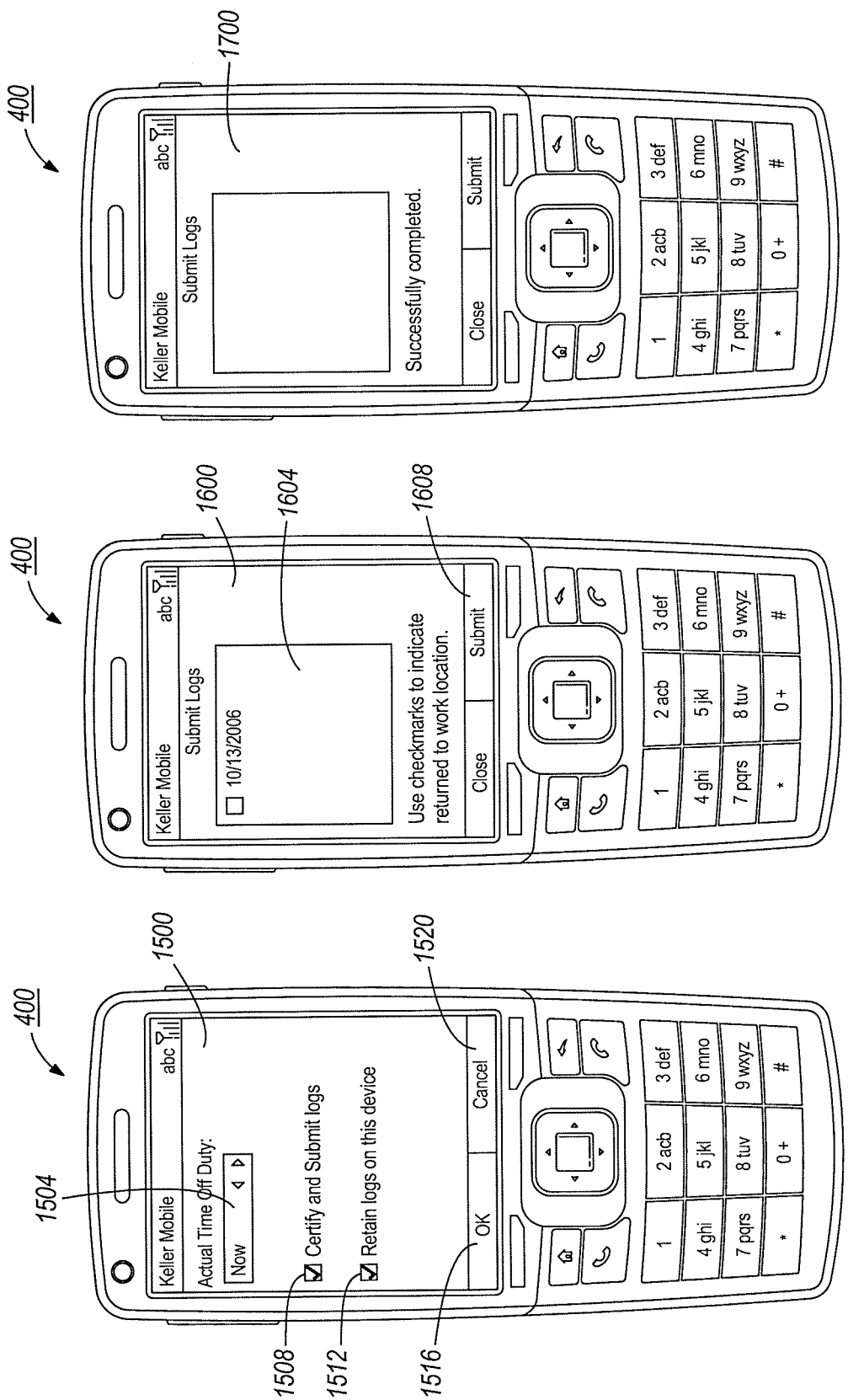

| Home | Employees | DQ Files | A&D Files | Accident Files | Training Files | Log Checker | Reports & Forms |
|---|---|---|---|---|---|---|---|

◁◁ Back To Previous Page     Switch To Unit Mode

◁ View Employee Log Checker - John Doe
◁ View Employee Log Checker - John Doe
◁ Add Employee Log
◁ View Employee Log Checker - John Doe Employee Log △
▷ Change Log - Employee
▷ Change Log - Log Date

View Employee Log - John Doe — 1800

Log Information [ Edit... ] — 1808

| | |
|---|---|
| Log Date | 3/13/2006 |
| Total Miles | 0 |
| Driver Type | Property Carrying |
| Driver Returned/Released From Duty? | No |
| Off Duty Hours | 16.00 |
| Sleeper Hours | 0.00 |
| Driving Hours | 8.00 |
| On Duty Hours | 0.00 |
| Exempt Log? | No |

— 1804

Log Summary

| Duty Status | Time | Duration | Rule Set |
|---|---|---|---|
| Off Duty | 12:00 AM | 3.00 | US 60 Hour |
| Driving | 03:00 AM | 3.00 | US 60 Hour |
| Off Duty | 06:00 AM | 7.00 | US 60 Hour |
| Driving | 01:00 PM | 5.00 | US 60 Hour |
| Off Duty | 06:00 PM | 6.00 | US 60 Hour |

Violations

Locations [ Edit Full List... ]

Team Drivers [ Add New... ]

Receipts [ Add New... ]

*FIG. 18*

ELECTRONIC DRIVER LOGGING SYSTEM AND METHOD

RELATED APPLICATION

This application claims the benefit of U.S. Provisional Application Ser. No. 60/888,458 filed on Feb. 6, 2007, the entire contents of which are incorporated by reference herein.

BACKGROUND

Embodiments of the invention relate to systems and methods for computerized management of operators of commercial vehicles.

Operators of commercial motor vehicles ("CMV's") are required to meet certain specific performance standards and regulations for operating such vehicles. For example, some operators of the CMV's are required to meet hours-of-service regulations.

The U.S. Department of Transportation, Federal Motor Carrier Safety Administration ("FMCSA") has established a comprehensive list of regulations that professional operators of CMV's must comply with. These regulations govern drivers, CMV or trucking companies (sometimes called "carriers") and the CMV's belonging to the carriers. Professional operators must comply with the obligations imposed under federal and state requirements in these areas. The regulations not only include physical and age requirements, but also define the ways an operator can lose his commercial driving privileges. Trucking companies and companies having trucking operations that support their core business are typically required to evaluate and track many aspects of truck operators and their abilities to perform job tasks such as driver qualifications (such as operator licensing and renewal); alcohol and drug testing; accident reporting; driver training; and hiring and screening of applicants.

Many CMV's are equipped with electronic-on-board-recorders to record information relating to the CMV's. The information generally includes names of the carriers, and the U.S. Department of Transportation number of the CMV's. For compliance purposes, operators of the CMV's are also frequently required to collect other relevant information of the drivers such as name, duty status, date and time, locations of the CMV's, and distance traveled. As part of the standards and/or regulations, the operators are required to submit the collected information. Operators frequently submit the collected information on paper. Paper-based processes are often slow. As a result, important compliance information might not be received in time to enforce certain regulatory requirements or to take other relevant actions based on the information.

SUMMARY

Although, various paper-based systems and software are available to assist CMV carriers with some of the areas noted above, such systems are not completely satisfactory. Continued growth and regulation of the carrier industry as well as the increasingly sophisticated logistical mechanisms used to ensure timely and efficient delivery of goods has increased the need of operators to manage their drivers and fleets. As such, it is useful for carriers to have systems available for collecting and communicating information relating to tasks which must be performed under various regulations in order for the company to show that it and its drivers are in compliance. In addition, such information can be used for several management purposes and by the operators of such CMV's.

In one embodiment, the invention provides a logging system that includes a vehicle, a portable device, and a remote host. The vehicle includes a controller and a base unit. The controller is positioned in the vehicle, and monitors one or more operating parameters of the vehicle. The base unit is mounted in the vehicle, and is connected to the controller to receive and store the one or more operating parameters from the device. The portable device, typically carried by the driver, can be coupled to the base unit. Once coupled, the portable device receives identifying information from the driver, receives the one or more operating parameters from the base unit, determines compliance data based, at least in part, on the identifying information and the one or more operating parameters, and wirelessly transmits signals based on the compliance data. The remote host is configured to wirelessly receive the signals from the portable device, and to wirelessly manage the portable device based, at least in part, on the received signals.

In another embodiment, the invention provides a system for logging performance of a driver operating a vehicle. The system includes a base unit, a portable device, and a remote host. The base unit is mounted in the vehicle and is configured to monitor one or more operating parameters of the vehicle. The portable device can be coupled to the base unit to receive identifying information from the driver, to receive the one or more operating parameters from the base unit, to determine compliance data based, at least in part, on the identifying information and the one or more operating parameters, and to wirelessly transmit signals based on the compliance data. The remote host can wirelessly receive the signals from the portable device, and wirelessly manage the portable device based, at least in part, on the received signals.

In yet another embodiment, the invention provides a method for logging performance of a driver operating a vehicle. The method includes receiving identifying information from the driver at a portable device, verifying the identifying information from the driver at the portable device, and receiving one or more operating parameters from the vehicle at the portable device once the identifying information has been verified. The method also includes determining compliance information based, at least in part, on the identifying information and the one or more operating parameters at the portable device, wirelessly transmitting compliance signals indicative of the compliance data from the portable device, and wirelessly receiving the compliance signals at a remote host from the portable device. The method also includes generating managing signals based on the received signals at the remote host, wirelessly transmitting the managing signals from the remote host to the portable device, wirelessly receiving the managing signals at the portable device, and managing performance of the driver and the vehicle based on the received managing signals.

Other aspects of the invention will become apparent by consideration of the detailed description and accompanying drawings.

BRIEF DESCRIPTION OF THE DRAWINGS

FIG. 4 shows a portable device in the form of a smart phone displaying a login screen.

FIG. 5 shows the smart phone of FIG. 4 displaying a trip login screen.

FIG. 6 shows the smart phone of FIG. 4 displaying a location edit screen.

FIG. 10 shows the smart phone of FIG. 4 displaying a plurality of menu functions in the status screen of FIG. 9.

FIG. 11 shows the smart phone of FIG. 4 displaying a duty status report screen.

FIG. 12 shows the smart phone of FIG. 4 displaying a log detail screen detailing a specific log entry of FIG. 1.

FIG. 15 shows the smart phone of FIG. 4 displaying a logout screen.

FIG. 16 shows the smart phone of FIG. 4 displaying a log submission screen.

FIG. 17 shows the smart phone of FIG. 4 displaying a log submission complete screen.

FIG. 18 shows an exemplary screen of the remote host application of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one particular embodiment, the invention provides a system for logging performance of a driver operating a vehicle having a vehicle information system from which at least one vehicle operating parameter may be obtained in a performance monitoring process. The vehicle operating parameter collected through the vehicle information system and information such as operator identity from a portable device are wirelessly communicated to a remote host through a network such as the Internet.

Figure 1:
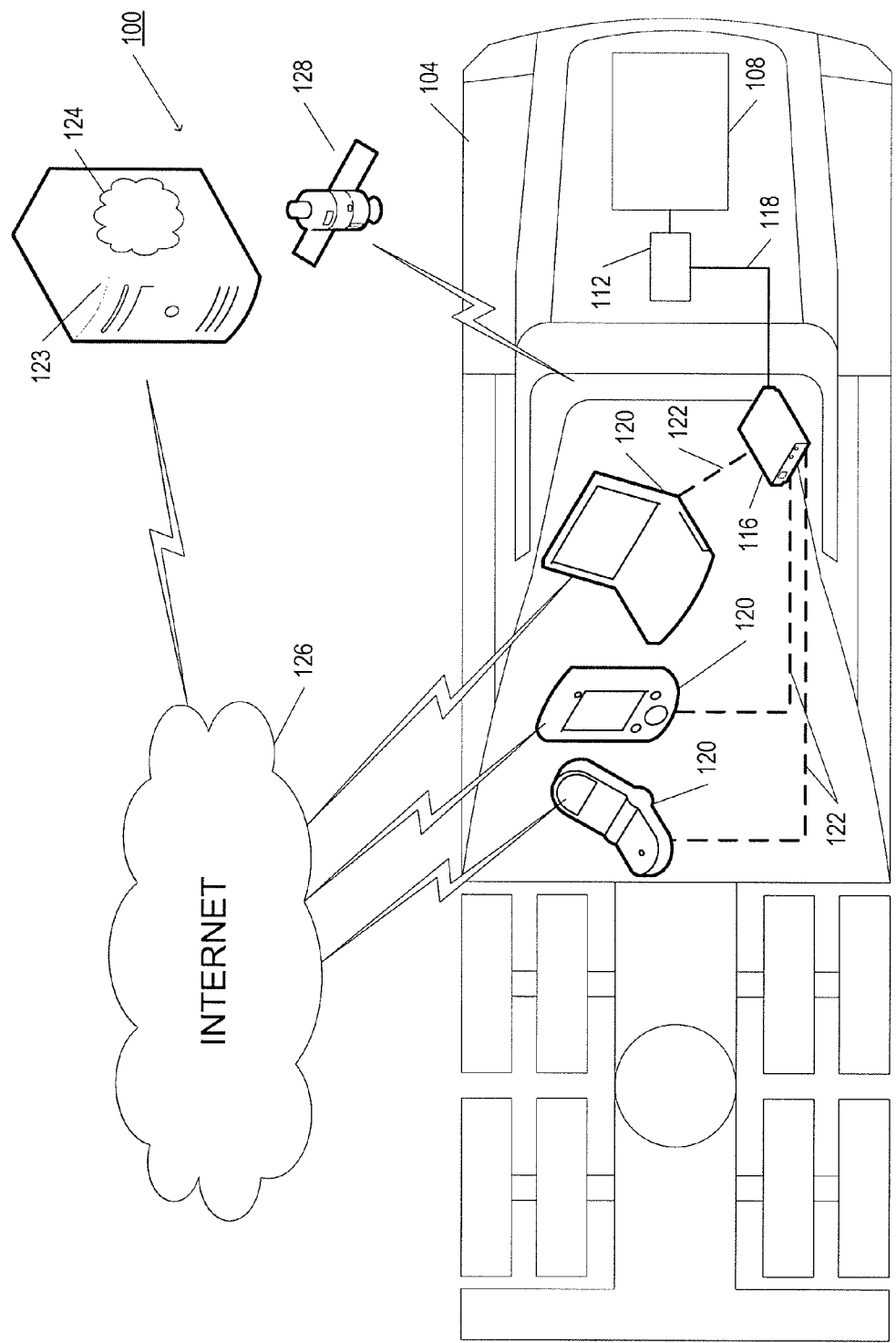
FIG. 1 is a schematic illustration of a system structured in accordance with an embodiment of the invention.

FIG. 1 shows a performance monitoring system 100 for use with a commercial motor vehicle ("CMV") 104. Although the CMV 104 illustrated is a tractor configured to tow a trailer (not shown), the performance monitoring system 100 can also be implemented in other types of CMV's such as construction vehicles and agricultural equipment. The CMV 104 includes an engine 108 that drives the CMV 104, and is controlled by an electronic control unit ("ECU") 112 that determines operating information or parameters from the engine 108, and other parts of the CMV 104. Operating parameters monitored by the ECU 112 include speed, hours of service, operating status, ignition switch status, trip distance, total vehicle distance, and the like.

The performance monitoring system 100 also includes an electronic on-board recorder ("EOBR") base unit 116 that communicates with the ECU 112 through an information bus 118 conforming to standards such as SAE J1939 and SAE J1708 network buses. The base unit 116 has a plurality of functions including, but not limited to, time keeping and data logging. In one implementation, the base unit 116 records and stores CMV information or data necessary to comply with FMSCA regulations such as those mentioned above from the ECU 112. The performance monitoring system 100 also includes a portable device 120 such as a mobile phone, a personal-digital-assistant ("PDA"), a laptop computer, or the like, that communicates with the base unit 116. The base unit 116 communicates with the portable device 120 through a cable or wireless link 122. The link 122 may be a serial cable, such as a USB cable. Other exemplary links include a wireless personal-area-network such as Bluetooth, and the like. The portable device 120 generally supports multiple platforms such as Windows Mobile 5 cell phones, Pocket PC 2003 (or better) PDA's, and computers such as laptops. The performance monitoring system 100 also includes a remote host server 123 running a remote host application 124 that wirelessly communicates with the portable device 120 via a network such as the Internet, detailed hereinafter. In some embodiments, a global position satellite ("GPS") system 128 also communicates with the ECU 112 and/or the base unit 116 so that information from the GPS system 128 (such as time and location) is available to the CMV 104. In some embodiments, at least a portion of the information stored in the base unit 116 or information communicated to and from the base unit 116 is encrypted.

Figure 2:
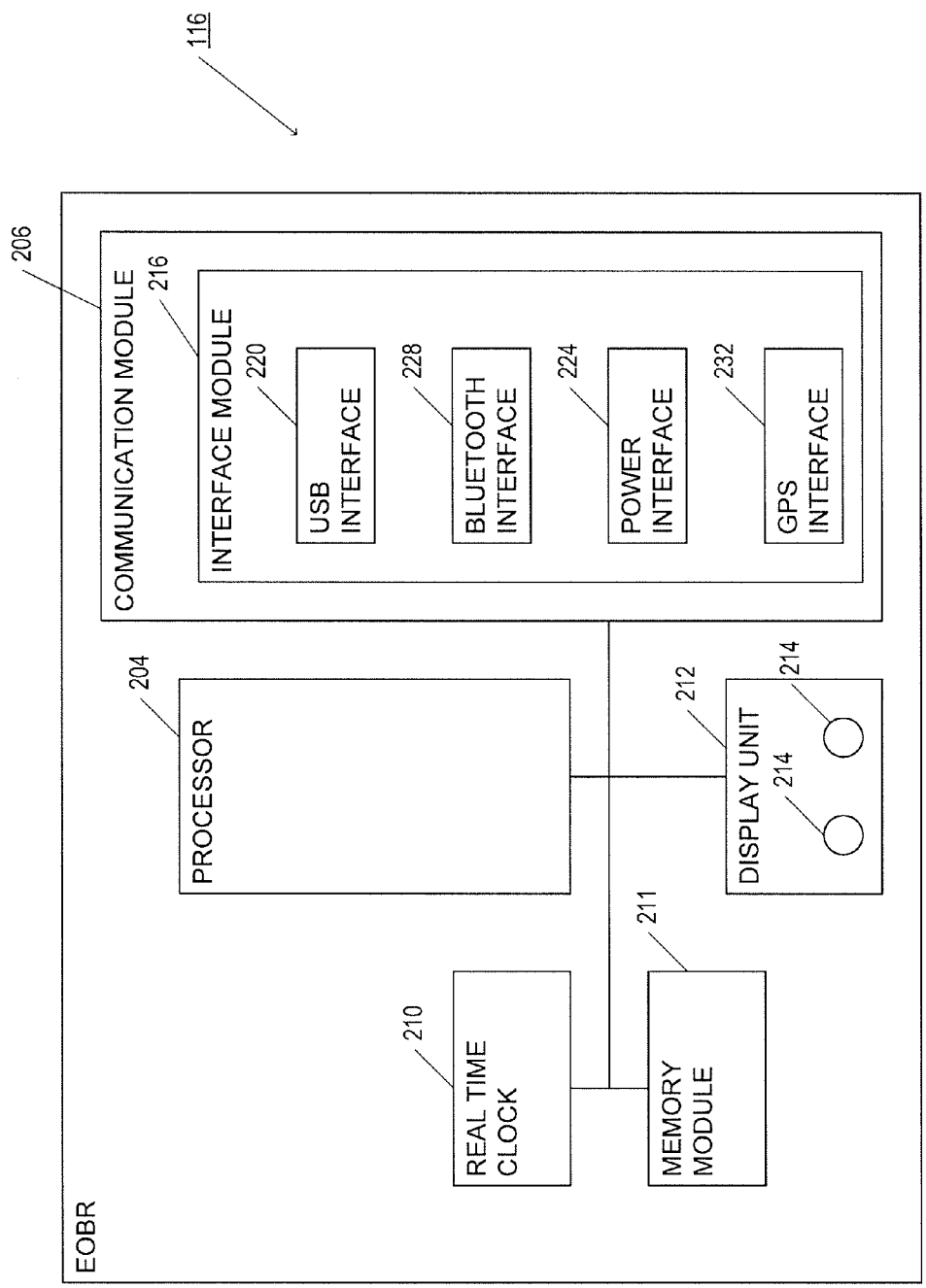
FIG. 2 illustrates a base unit of the system in FIG. 1 in a block diagram format.

FIG. 2 shows the base unit 116 in a block diagram format. As shown, the base unit 116 includes a processor (such as a microprocessor, controller or application-specific-integrated-circuit ("ASIC")) 204. The base unit 116 also includes a communication module 206, a real-time clock 210, and a display unit 212. In some embodiments, the base unit 116 includes a memory module 211 that stores CMV information. In some embodiments, the display unit 212 includes a plurality of LED's 214 to indicate the status of the base unit 116, such as, a connection status that indicates whether a portable device has been connected to the base unit 116, a system status that indicates whether the base unit 116 is properly functioning, a communication status that indicates if signals are communicated between the base unit 116 and the ECU 112, and a portable device communication status that indicates whether signals are communicated between the base unit 116 and a connected portable device such as the portable device 120.

In some embodiments, the memory module 211 stores a log of data retrieval history. For example, when a portable device such as the portable device 120 sends a request for data from the base unit 116, the base unit 116 logs the request, retrieves the data from the memory module 211, and communicates or delivers the data to the connected device. The memory module 211 also logs other information related to the request, such as the time span over which data was retrieved, the time the data was retrieved or time-stamped, and the size of the data that was delivered. In some embodiments, once the portable device has retrieved the data, the memory area that stored the retrieved data is marked extracted, transmitted, or downloaded, and is re-used, if necessary.

The communication module 206 includes an interface module 216 that includes a plurality of interfaces such as a USB interface 220, a vehicle power interface 224, an optional Bluetooth interface 228, and a GPS interface 232. In some embodiments, the USB interface 220 includes a B-type USB socket connector into which a USB cable can be inserted to allow the base unit 116 to communicate with devices such as the portable device 120. The power interface 224 provides power filtering and conditioning to support operations from power obtained from the CMV 104. Furthermore, the USB interface 220 also allows the base unit 116 to be field-programmable, that is, the base unit 116 can be reconfigured, modified, or upgraded via the USB interface 220. The GPS interface 232 supports a connection between an additional GPS board or device and the base unit 116. In some embodiments, the GPS interface 232 also includes an antenna input to accommodate an antenna that may be required.

Figure 3:
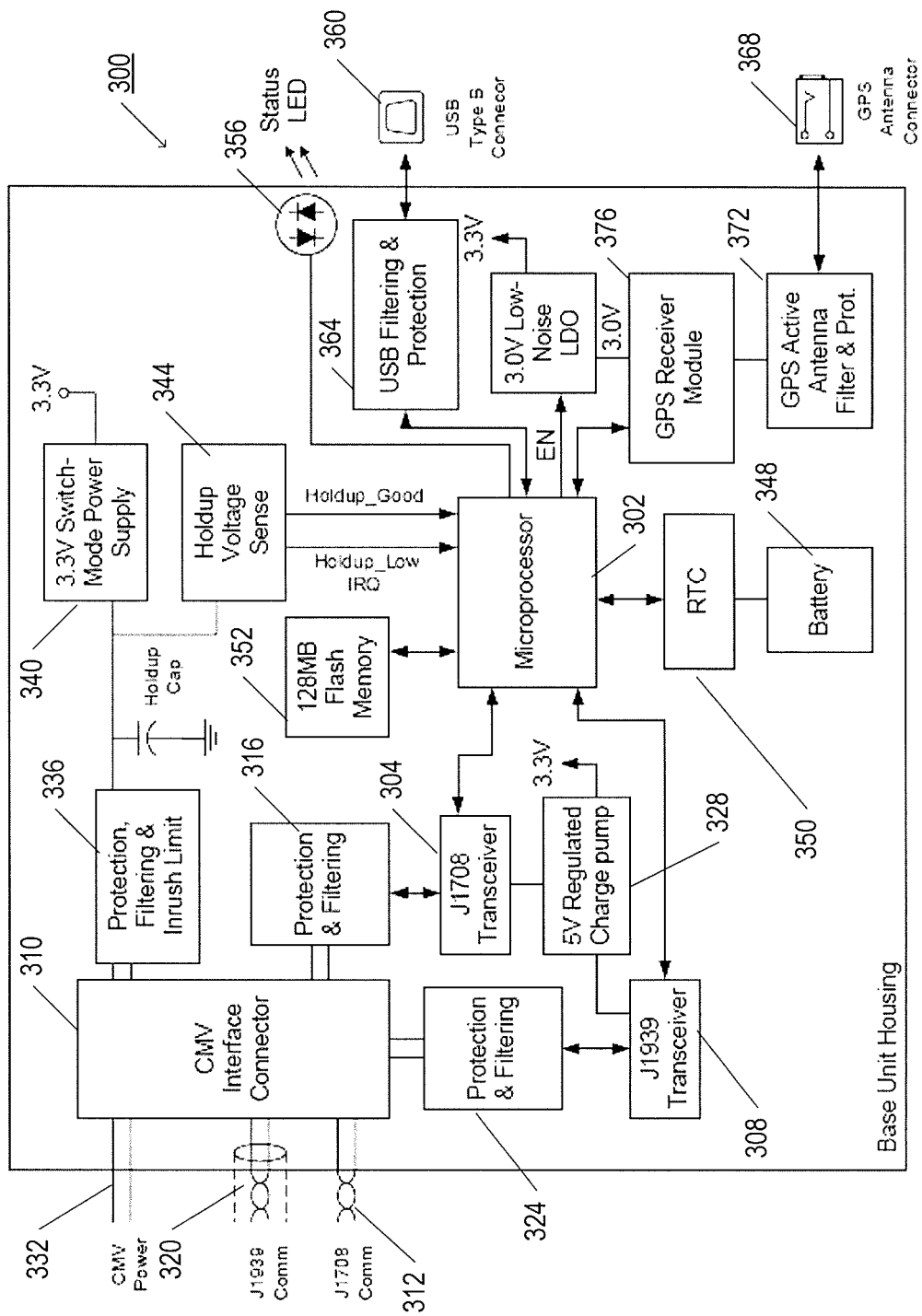
FIG. 3 is a circuit diagram for one embodiment of the base unit of FIG. 2.

FIG. 3 shows an exemplary base unit 300 (116 of FIG. 2), wherein like reference numerals refer to like parts. The base unit 300 includes a microprocessor 302 (204 of FIG. 2) that processes and outputs data as described. For example, the microprocessor 302 is coupled to first and second transceivers 304, 308, respectively, to receive external data. The first transceiver 304 conforms to a J1708 standard, and transmits and receives data through a CMV interface connector 310 (224 of FIG. 2), a J1708 communication bus 312, and a protection and filtering module 316. The protection and filtering module 316 filters the received data so that data noise can be reduced or eliminated. The protection and filtering module 316 also ensures that the received data has a predetermined amplitude range that is acceptable to the microprocessor 302. In this way, amplitude surges in data can be detected, and the microprocessor 302 can be protected.

Similarly, the J1939 transceiver 308 transmits and receives data through the CMV interface connector 310, a J1939 communication bus 320, and a second protection and filtering module 324. The second protection and filtering module 324 filters out noise from the received data, and limits an amplitude range of the received data. Both of the transceivers 304 and 308 are regulated by a charge pump 328. In the embodiment shown, the base unit 300 receives its power from the CMV 104 through the CMV interface connector 310 and a CMV power bus 332. The power is regulated and surge-protected with a protection, filtering, and inrush limit circuitry 336, a power supply circuit 340, and a voltage holdup circuit 344.

A battery 348 supplies power to the real-time clock ("RTC") 350 (210 of FIG. 2) which provides a real-time clock function to allow software to accurately determine a time with a predetermined resolution. In the embodiment shown, the resolution is 1 ms. In some embodiments, the RTC 350 is required to remain operational while the CMV 104 does not provide power to the base unit 300.

In the embodiment shown, a flash memory 352 (211 of FIG. 2) is connected to the microprocessor 302 to log a data retrieval history as described earlier. The flash memory 352 also logs other information related to the request, such as the time span over which data was retrieved, the time the data was retrieved or time-stamped, and the size of the data that was delivered. The microprocessor 302 also displays the status of the base unit 300 with a plurality of status light-emitting-diodes 356 (212 of FIG. 2). The base unit 300 also includes a USB type B connector 360 (220 of FIG. 2) to transmit and receive data through a USB connector of an external portable device. The received data is also filtered and protected with a USB protection and filtering module 364. To receive a GPS signal, the base unit 300 also includes a GPS antenna connector 368 (232 of FIG. 2) to be connected to a GPS antenna. Data received through the GPS antenna connector 368 is similarly filtered and protected with a GPS protection and filtering module 372. A GPS receiver module 376 then prepares the received data for further processing by the microprocessor 302.

Figure 3A:
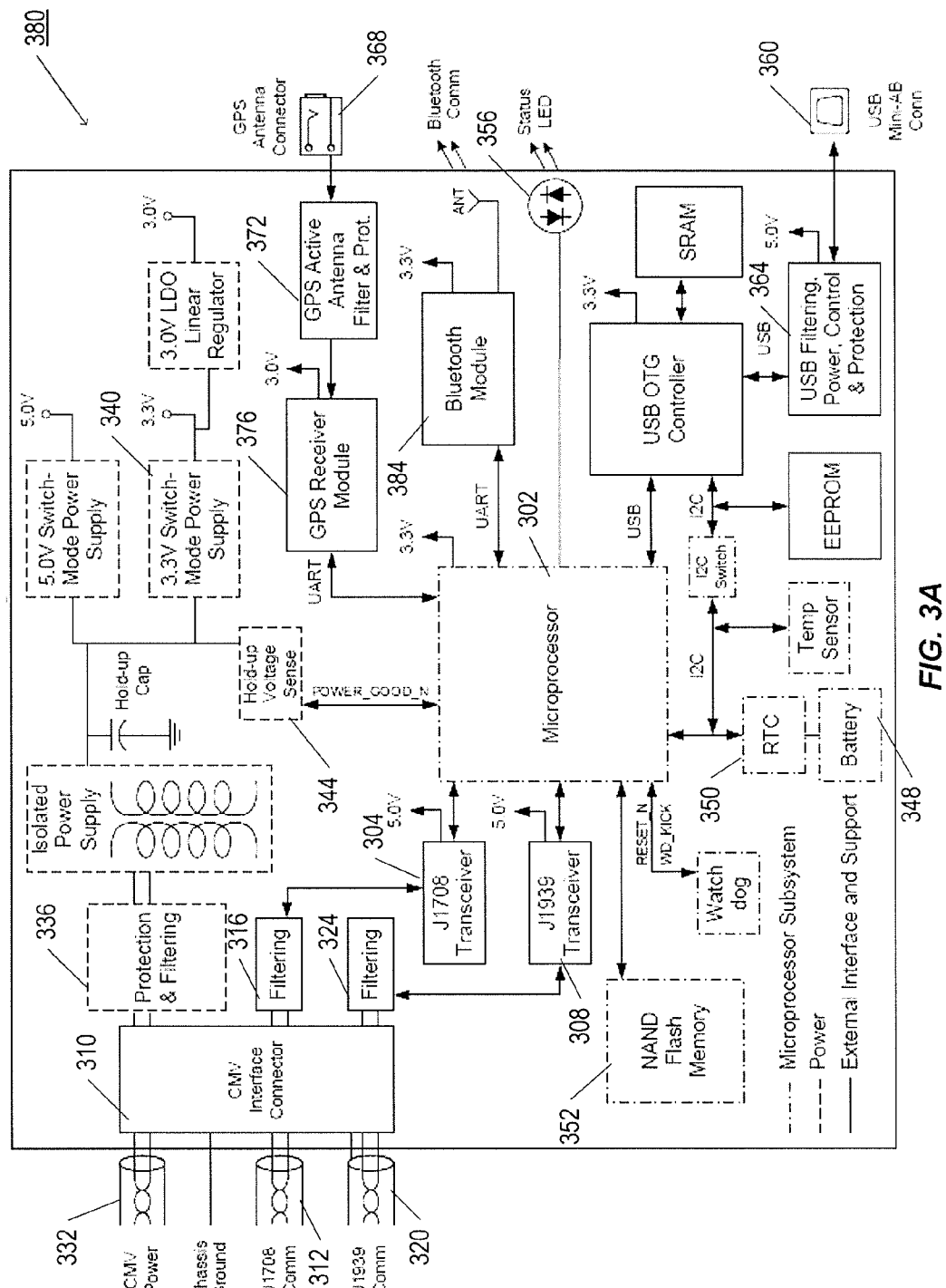
FIG. 3A is a circuit diagram for an alternative embodiment of the base unit of FIG. 2.

FIG. 3A shows an alternative embodiment of a base unit 380 (116 of FIG. 2), wherein like numerals refer to like parts. The base unit 380 includes the CMV interface connector 310 that connects to the CMV power bus 332, and communicates to the ECU 112 (of FIG. 1) with the J1708 communication bus 312 and the J1939 communication bus 320, via the first and second transceivers 304, 308, respectively. The microprocessor 302 processes and outputs data from the first and second transceivers 304, 308. In the embodiment shown, the base unit 380 also includes the flash memory 352, and a Bluetooth interface 384 (228 of FIG. 2) that communicates with the mobile devices 120 that are capable of Bluetooth wireless communications. Also, the USB interface 360, as shown, includes a USB Mini-AB connector.

FIG. 4 shows an example of the portable devices 120 in the form of a smart phone 400 displaying a login screen 402. In such cases, the smart phone 400 wirelessly connects to the base unit 116 via Bluetooth or other wireless connections, or is wired to the base unit 116 via one or more cables. The smart phone 400 includes a display 404 and generates a graphical user interface on the display 404. The graphical user interface prompts operators for information and displays information such as an hours-of-service of a particular operator and other information, as detailed hereinafter. The smart phone 400 also includes an input keyboard 408 to allow operators to enter operator or driver, and trip information. The display 404, as shown in FIG. 4, via a software application installed in the smart phone 400 shows the login screen 402, and prompts the operator for login or identifying credentials such as identity or username at a username entry 412 and a password at a password entry 416. Once the username and the password have been entered and verified, the CMV driver or operator starts a performance monitoring process. Initially, if there is no log entry attributed to the operator, the portable device 120 attempts to establish a network connection with the remote host application 124. In turn, the remote host application 124 verifies the identifying credentials, detailed hereinafter. After the remote host application 124 has verified the identifying credentials, the remote host application 124 passes back via a return parameter a validation signal to the portable device 120.

As shown in FIG. 5, after receiving a validation signal from the remote host application 124, the smart phone 400 (via the software application), in a trip login screen 500, prompts the operator for trip information such as a tractor identification number at a tractor number entry 504, a trailer number at a trailer number entry 508, and shipment information at a shipment info entry 512. Similarly, as shown in FIG. 6 in a location edit screen 600, the operator is prompted for a location code at a entry 604, and/or an actual location at entry 608.

Figure 8:
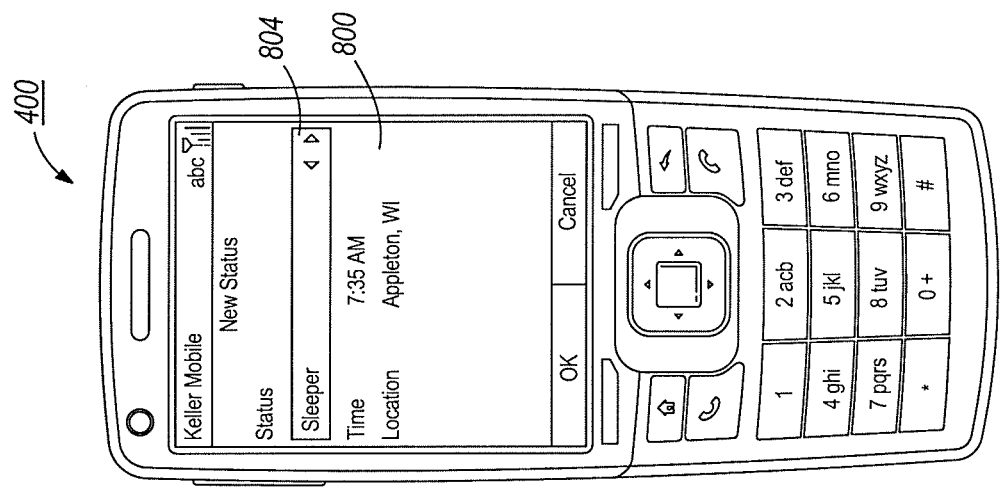
FIG. 8 shows the smart phone of FIG. 4 displaying a status edit screen.
Figure 7:
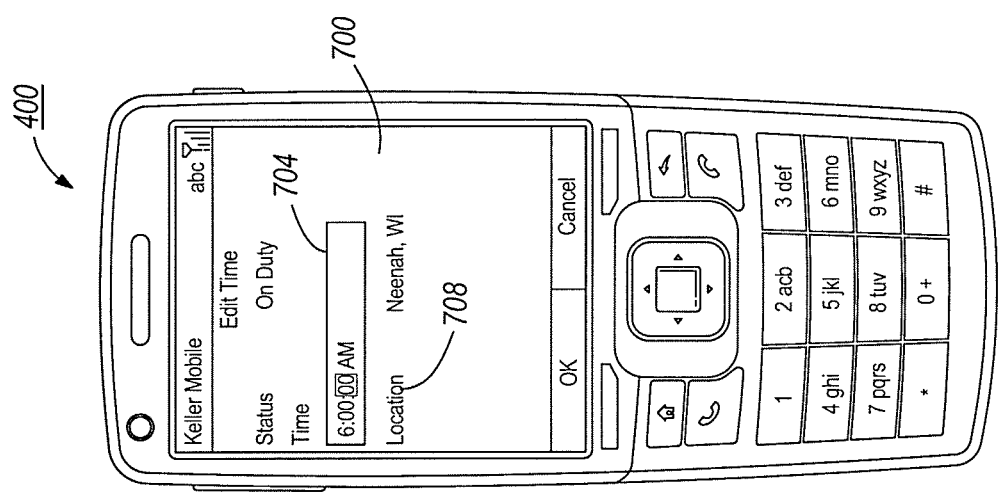
FIG. 7 shows the smart phone of FIG. 4 displaying a time edit screen.

FIG. 7 shows a time edit screen 700. Once logged on, the operator is also allowed to edit a time entry 704, and/or a location entry 708 in the time edit screen 700. FIG. 8 shows a status edit screen 800 in which the operator is allowed to add a new duty by selecting a new duty entry 804 using the display 404 and the keyboard 408. After selecting the new duty entry 804, a status screen appears that allows the operator to further modify or update the status of his or her activities (for example, in sleeper, driving, and the like), detailed hereinafter.

Figure 9:
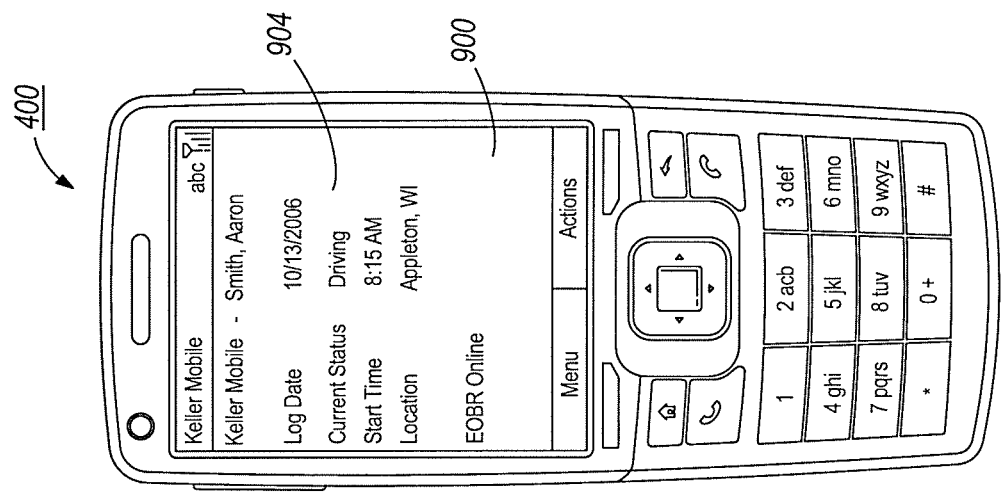
FIG. 9 shows an exemplary status screen of a CMV operated by a CMV driver.

After CMV 104 is in motion, e.g., traveling down a road, the ECU 112 monitors the distance traveled. As shown in an exemplary status screen 900 of FIG. 9, once the CMV 104 has traveled a predetermined amount of time and/or distance, it is assumed the CMV 104 is being driven to a desired destination rather than, for example, being moved from one parking spot to another. Subsequently, the smart phone 400 displays a current status in the status field 904 to reflect changes in the operator status (now "driving"). After the CMV arrives at a destination and stops, the smart phone 400 prompts the operator for a new destination location in the location entry 708 (of FIG. 7). This information is then stored in the memory module 211.

As shown in FIG. 10, the status screen 900 also includes a menu tab 1002. When the menu tab 1002 is activated, the smart phone 400 displays a menu 1003. In the embodiment shown, the menu 1003 includes a "Records" option 1004, a "Reports" option 1008, a "Team Driver" option 1012, a "Team Driver Share" option 1016, and a "File" option 1020. In some embodiments, the "Records" option 1004 allows a driver to access records such as trip information, employee rules, and the like, and also allows a driver to download records, certify and submit logs, identify unassigned driving periods, and edit log locations, detailed hereinafter. In some embodiments, the "Reports" option 1008 allows a driver to generate or access information such as, for example, duty status, daily hours, failure reports such as vehicle failure reports, and location codes, some of which are detailed hereinafter. The "File" option 1020 allows a driver to change his or her password, enter the performance monitor process into a road-side inspection mode, and check for updates such as trip updates, rule set updates, and the like.

When a driver activates the "Report" option 1008 and selects to display the duty status, the smart phone 400 displays the duty status as discussed, as shown in an exemplary duty status report screen 1104 of FIG. 11. In the embodiment shown, the duty status report screen 1104 summarizes all entries collected thus far. When the operator activates a "Detail" tab 1108 on the duty status report screen 1104, the smart phone 400 displays details of the entries, as shown in a log detail screen 1204 of FIG. 12. In the embodiment shown, the status report screen 1108 lists information such as log date, tractor, trailer, shipment, driver type, time zone, rule set, and distance traveled.

In some cases, a regulation enforcement officer can ask a CMV driver for his or her driving logs for a predetermined number of days, such as, for example, seven days, prior to the day of inquiry, or for a predetermined amount of time, such as, for example, 168 hours, prior to the time of inquiry. However, when the smart phone 400 is new, the smart phone 400 may not have been configured to include existing logs of a particular driver and/or a particular CMV. When the logs of interest are not stored in the smart phone 400, a CMV driver can use the smart phone 400 to download the logs of interest from other places, such as, for example, the remote host server 123 via the Internet, and/or from the base unit 116.

Figure 13:
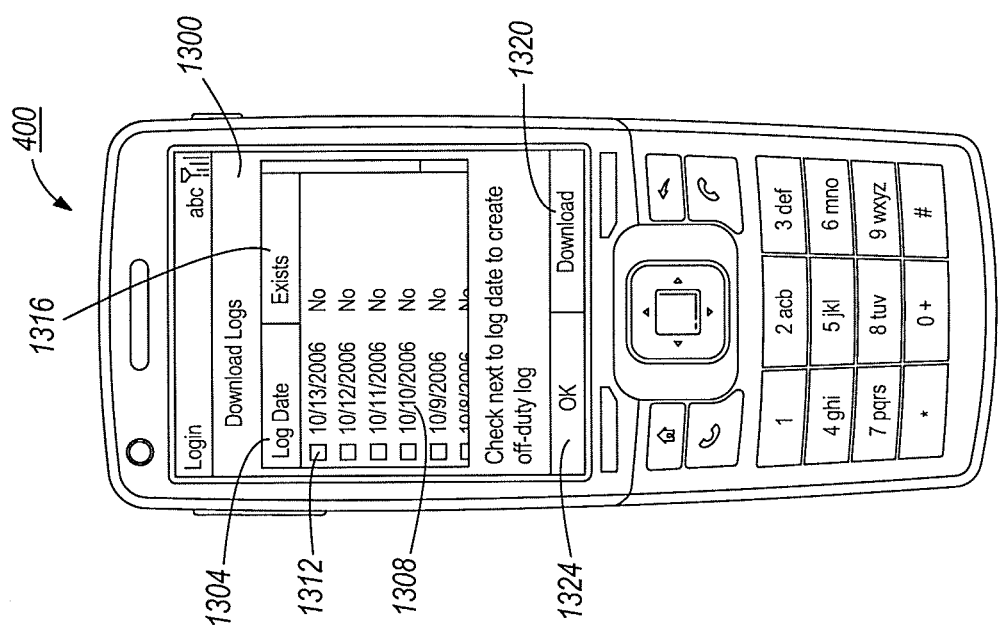
FIG. 13 shows the smart phone of FIG. 4 displaying a log download screen.

FIG. 13 shows the smart phone of FIG. 4 displaying a log download screen 1300 which prompts a user to download one or more logs to the smart phone 400. Particularly, in the embodiment shown, the log download screen 1300 includes a log date column 1304 which lists a plurality of logs 1308 that are available for download, and their corresponding dates. Each of the available logs 13 has a corresponding check box 1312 to accept an input selection from a user. In the embodiment shown, logs 1308 from the last few days are available to be downloaded to the smart phone 400. In other embodiments, logs from additional periods of time are also available to be downloaded to the smart phone 400. The log download screen 1300 also includes an "Exists" column 1316 which indicates whether each of the logs 1308 in the log date column 1308 exists, or has already been stored in the smart phone 400. In the embodiment shown, none of the available logs 1308 is stored in the smart phone 400. Once a user has checked one or more of the check boxes 1312 and tabbed a download button 1320, the selected logs are downloaded to the smart phone 400.

Figure 14:
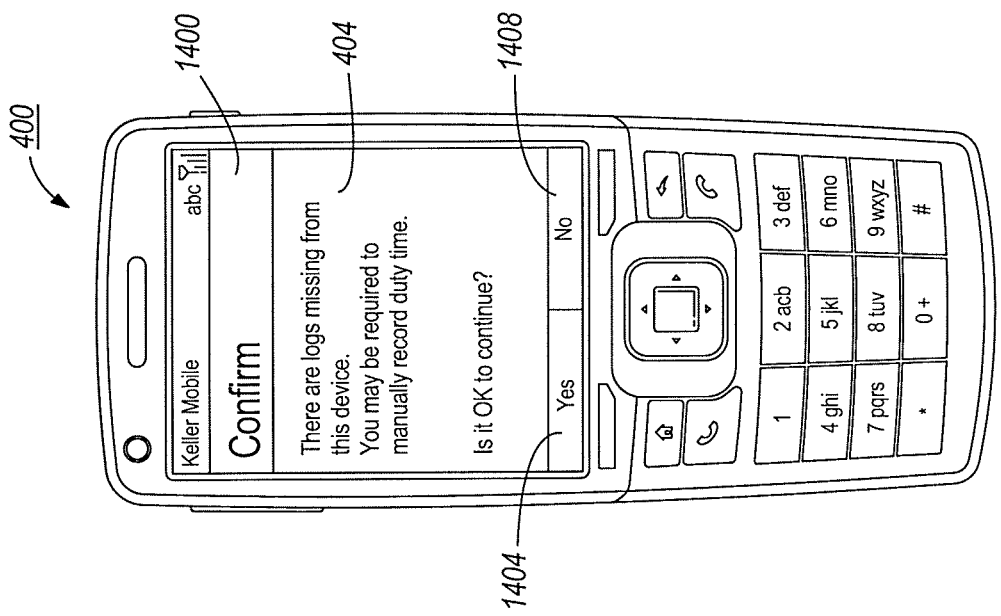
FIG. 14 shows the smart phone of FIG. 4 displaying a confirmation screen

If the user tabs an OK button 1324 or the download button 1320 without selecting any of the logs 1308, the user is required to confirm that the user has elected not to store any of the available and downloadable logs 1308 to the smart phone 400. FIG. 14 shows the smart phone of FIG. 4 displaying a confirmation screen 1400. In the embodiment shown, the confirmation screen 1400 indicates that logs are missing, and prompts the user to select between a "Yes" tab 1404 which confirms no logs are downloaded, and a "No" tab 1408 which returns the display 404 from screen 1400 back to screen 1300.

When a CMV driver logs out of the performance monitoring process, he or she is given an option of submitting any available logs in a certification process. In this way, the CMV driver can legally submit the logs for regulation compliance purposes. Particularly, FIG. 15 shows the smart phone of FIG. 4 displaying a logout screen 1500 of the certification process on the smart phone 400. The logout screen 1500 includes an "Actual Time Off Duty" dialog box 1504 allowing the CMV driver to select an actual time that the CMV driver is off duty. In the embodiment shown, the CMV driver has selected to complete the submission "Now" in the dialog box 1504. Other options of the dialog box 1504 include, but are not limited to, one hour, two hours, and the like. The additional time allows the CMV driver to conduct a post trip inspection, for example. After selecting a time for the dialog box 1504, the CMV driver has to manually select on the logout screen 1500 to certify and submit logs by tapping a certify check box 1508, and/or to retain the logs in the smart phone 400 by tapping a retain check box 1512. After selecting to certify the logs and/or to retain the logs, the CMV driver then taps an "OK" tab 1516 to continue the certification process, or a "Cancel" tab 1520 to cancel the certification process.

After the driver has tapped the OK tab 1516 to continue the certification process, the smart phone 400 displays a plurality of logs that are available for submission and certification. FIG. 16 shows the smart phone 400 of FIG. 4 displaying an exemplary log submission screen 1600 which lists an available log in a log list box 1604. When the CMV driver taps a "Submit" tab 1608, the smart phone 400 submits the available logs listed in the log list box 1604 and indicates that the certification process is complete. FIG. 17 shows the smart phone 400 of FIG. 4 displaying an exemplary log submission complete screen 1700.

FIG. 18 shows an exemplary screen 1800 of the remote host application 124. Once the log is received at the remote host application 124, the remote host application 124 stores and calculates parameters such as hours-of-service information of the operator and alerts the operator or the carrier of any violations of predetermined FMCSA rules. For example, a log summary area 1804 lists all duty entries the operator submitted through the portable device 120. A log information area 1808 lists other driver and vehicle parameters collected. The remote host application 124 thus can rearrange the entries collected and generates different reports as needed. Furthermore, if an operator has a non-compliance violation, the remote host application 124 will also transmit a signal back to the portable device 120 to alert the operator of the violation.

In the embodiment shown, the log information area 1808 lists a plurality of log entries, such as, for example, a "Log Date" indicating a log date of the received log, a "Total Miles" indicating a total mileage driven by the operator, a "Driver Type" indicating a type of qualifications or restrictions on a driver, for example, whether the driver is licensed to drive a property-carrying vehicle or a passenger-carrying vehicle or restrictions apply based on the type of shipment or cargo, a "Drive Returned/Release From Duty" indicating whether the operator has returned from duty or the operator has been released from duty, an "Off Duty Hours" identifying an amount of time that the CMV driver is off duty, a "Sleeper Hours" indicating an amount of time that the CMV driver has been on sleeper hours, a "Driving Hours" indicating an amount of time that the CMV driver has been driving for the trip, an "On Duty Hours" indicating an amount of time that the CMV driver has been on duty, and an "Exempt Log" indicating if the submitted log can be exempted from logging. Similarly, the log summary area 1804 summarizes log entries for a trip administered by the CMV driver. For example, the summary area 1804 lists entries such as, for example, a duty status, a time, a duration, and a rule set used by the CMV driver. In the embodiment shown, the rule set is "US 60 hour." The CMV driver was off duty from 12:00 AM to about 3:00 AM for about three hours. Afterwards, the CMV driver was driving from 3:00 AM to about 6:00 AM for about three hours. The CMV driver was again off duty from 6:00 AM to about 01:00 PM for about seven hours, and drove from 01:00 PM to about 06:00 PM for about six hours. As such, the CMV driver drove for a total of about eight hours, as displayed in the Driving Hours entry of the log information area 1808. The screen 1800 is also expandable to display other information such as, violations, locations (which indicates locations the CMV driver has traveled during the trip), team drivers (which indicates a list of operators involved in the trip), and receipts (which indicates a list of receipts collected during the trip).

Various features and aspects of embodiments of the invention are set forth in the following claims.

What is claimed is:

1. A logging system for a commercial motor vehicle ("CMV") operated by a driver, the logging system comprising:
    a non-portable base unit including a processor and non-transitory computer-readable medium and configured to be located in the CMV, to be connected to a controller monitoring at least one operating parameter of the CMV, and to receive and store the at least one operating parameter from the controller in the non-transitory computer-readable medium;
    a portable device configured to be coupled to the base unit, to receive identifying information from the driver, to receive the at least one operating parameter from the base unit stored in the non-transitory computer-readable medium of the base unit, to determine compliance data based, at least in part, on the identifying information and the at least one operating parameter, and wirelessly transmit signals based on the compliance data, the portable device having a display and, configured to generate a graphical user interface on the display; features to prompt the driver for the identifying information and trip information, features to display a current status of the CMV based, at least in part, on the identifying information and the trip information, to list a plurality of logs based, at least in part, on the received operating parameter, the identifying information, and the trip information, and to list at least one log unavailable in the portable device; and
    a remote host configured to wirelessly receive the signals based on the compliance data, the identifying information, and the trip information from the portable device and to wirelessly manage the portable device based, at least in part, on the received signals;
    the base unit storing the at least one operating parameter when the portable device is decoupled from the base unit.

2. The system of claim 1, wherein the portable device comprises at least one of a computer, a personal-digital-assistant ("PDA"), and a smart phone.

3. The system of claim 1, wherein the portable device is wirelessly coupled to the base unit via at least one of a personal area network connection and a cellular connection.

4. The system of claim 1, wherein the trip information includes at least one of a tractor identification, trailer number, shipment information, and location code.

5. The system of claim 1, wherein the portable device is further configured to list at least one of a log date, driver type, time zone, rule set, and distance traveled by the CMV on the display.

6. The system of claim 1, wherein the compliance data includes an hour-of-service log of the driver.

7. The system of claim 1, wherein the portable device is configured to selectively download the at least one log unavailable in the portable device.

8. The system of claim 1, wherein the portable device is further configured to generate the graphical user interface to prompt the driver for a new destination location when the CMV reaches a destination based, at least in part, on information from the controller and the base unit.

9. The system of claim 1, wherein the remote host is further configured to generate an alert for noncompliant performance of the driver.

10. The system of claim 1, wherein a controller-area-network bus couples the base unit to the controller.

11. The system of claim 1, wherein the remote host is configured to wirelessly transmit signals indicative of a type of operating parameter to be monitored by the base unit.

12. The system of claim 1, wherein the remote host is configured to wirelessly communicate with the portable device via the Internet.

13. A system for logging performance of a driver operating a commercial motor vehicle ("CMV"), the system comprising:
    a non-portable base unit including non-transitory computer-readable medium and configured to be mounted in the CMV to receive at least one operating parameter from the CMV, and to store the at least one operating parameter in the non-transitory computer-readable medium; and
    a portable device configured to be coupled to the base unit, to receive identifying information from the driver, to receive the at least one operating parameter stored in the non-transitory computer-readable medium from the base unit, to determine compliance data based, at least in part, on the identifying information and the at least one operating parameter, and to wirelessly transmit signals based on the compliance data;
    the portable device having a display and configured to generate a graphical user interface on the display, to prompt the driver for the identifying information and trip information, to display a current status of the CMV based, at least in part, on the identifying information and the trip information, to list a plurality of logs based, at least in part, on the received operating parameter, the identifying information and the trip information, and to list at least one log unavailable in the portable device;
    the base unit storing the at least one operating parameter when the portable device is decoupled from the base unit.

14. The system of claim 13, wherein the portable device comprises at least one of a computer, a personal-digital-assistant ("PDA"), and a smart phone.

15. The system of claim 13, wherein the portable device is wirelessly coupled to the base unit with at least one of a wireless personal area network connection and a cellular connection.

16. The system of claim 13, wherein the trip information includes at least one of a tractor identification, trailer number, shipment information, and location code.

17. The system of claim 13, wherein the portable device is further configured to generate the graphical user interface to list at least one of a log date, driver type, time zone, rule set, and distance traveled by the CMV.

18. The system of claim 13, wherein the compliance data includes an hour-of-service log of the driver.

19. The system of claim 13, wherein the portable device is configured to selectively download the at least one log unavailable in the portable device.

20. The system of claim 13, wherein the graphical user interface is further configured to prompt the driver for a new destination location when the CMV reaches a destination based, at least in part, on information from the base unit.

21. The system of claim 13, wherein the portable device is further configured to generate an alert for noncompliant performance of the driver.

22. The system of claim 13, wherein the portable device is configured to wirelessly transmit the signals via the Internet.

23. A method for logging performance of a driver operating a commercial motor vehicle ("CMV"), the method comprising:

receiving identifying information and trip information from the driver at a portable device, the portable device including a display and configured to generate a graphical user interface on the display to prompt the driver for the identifying information and the trip information and to display a current status of the CMV based, at least in part, on the identifying information and the trip information;

verifying the identifying information from the driver at the portable device; receiving at least one operating parameter of the CMV at the portable device through a non-portable base unit coupled to the portable device after the identifying information has been verified, the base unit including a processor and non-transitory computer-readable medium and configured to be located in the CMV, to be connected to a controller monitoring the at least one operating parameter of the CMV, and to receive and store the at least one operating parameter in the non-transitory computer-readable medium when the portable device is decoupled from the base unit;

determining compliance data based, at least in part, on the identifying information and the at least one operating parameter at the portable device; wirelessly transmitting compliance signals indicative of the compliance data from the portable device; wirelessly receiving the compliance signals at a remote host from the portable device;

generating managing signals based on the received signals at the remote host; wirelessly transmitting the managing signals from the remote host to the portable device; wirelessly receiving the managing signals at the portable device; and managing performance of the driver and the CMV based on the received managing signals by listing on the graphical user interface a plurality of logs based, at least in part, on the at least one operating parameter, the identifying information, and the trip information and listing on the graphical user interface at least one log unavailable in the portable device.

24. The method of claim 23, wherein the portable device comprises at least one of a computer, a personal-digital-assistant ("PDA"), and a smart phone.

25. The method of claim 23, further comprising:

prompting the driver for the identifying information and trip information;

displaying a current status of the CMV based, at least in part, on the identifying information and the trip information;

listing a plurality of logs based, at least in part, on the received operating parameters, the identifying information, and the trip information; and listing at least one log unavailable in the portable device.

26. The method of claim 25, wherein the trip information includes at least one of a tractor identification, trailer number, shipment information, and location code.

27. The method of claim 25, further comprising selectively downloading the least one log unavailable in the portable device.

28. The method of claim 23, further comprising wirelessly coupling the portable device to the vehicle with at least one of a wireless personal area network connection and a cellular connection.

29. The method of claim 23, further comprising listing at least one of a log date, driver type, time zone, rule set, and distance traveled by the CMV.

30. The method of claim 23, wherein the compliance data includes hours-of-services of the driver.

31. The method of claim 23, further comprising prompting the driver for a new destination location when the CMV reaches a destination based, at least in part, on data received from the controller and the base unit.

32. The method of claim 23, wherein the remote host is configured to wirelessly communicate with the portable device via the Internet.

* * * * *